June 20, 1950 C. A. CORNELL 2,512,309
TIRE REPAIR UNIT

Filed Jan. 30, 1947 2 Sheets-Sheet 1

INVENTOR.
Charles A. Cornell.
BY
Corbett, Mahoney + Miller
ATTORNEYS

June 20, 1950 C. A. CORNELL 2,512,309
TIRE REPAIR UNIT

Filed Jan. 30, 1947 2 Sheets-Sheet 2

INVENTOR.
Charles A. Cornell.
BY
ATTORNEYS

Patented June 20, 1950

2,512,309

UNITED STATES PATENT OFFICE 2,512,309

TIRE REPAIR UNIT

Charles A. Cornell, Johnstown, Ohio

Application January 30, 1947, Serial No. 725,289

8 Claims. (Cl. 152—367)

My invention relates to a tire repair unit. It has to do, more particularly, with a repair patch adapted to be used inside a tire casing to repair or reinforce an injured portion of the casing. More specifically, it relates to a repair patch which is adapted to be placed over the injury and to be vulcanized in such position so as to become an integral part of the casing.

It is common to use at present in vulcanizing repairs of tire casings what is familiarly known in the trade as "crisscross" repair units or patches. These crisscross patches consist of two or more strips or plies of rubberized cords or fibers with the cords in each strip extending longitudinally thereof and with strips crossed at right angles to each other. In repairing a hole or injury in the casing, this type of patch is placed within the casing and is centered over the injury. Furthermore, the patch is so disposed that the cords of the crisscross strips or plies of the patch extend in the same directions as the cords in the tire casing which are arranged in crisscross relationship from bead to bead. With the patch so located in the casing over the hole therein, the hole is filled from the outside with uncured rubber and the patch and uncured rubber filling are then vulcanized to the casing and become an integral part thereof. By having the cords of the patch extend in the same directions as the cords in the tire casing, a considerable degree of flexibility is obtained.

I have found, however, that with the crisscross arrangement of strips or plies where a series have the cords thereof extending in one direction and the other series have the cords thereof extending at right angles, the same as the cords of the tire, that too much flexibility is inherent in the patch at the center thereof over and around the hole in the casing. This high degree of flexibility adjacent the hole which is especially prevalent in the bead-to-bead direction, of the casing, causes stretching and contraction of the attached vulcanized rubber filling material in the hole and eventually causes the rubber filling to pull out of the hole or to loosen at the edges thereof.

One of the objects of my invention is to provide a tire repair patch of the general type indicated but which is so designed that the tendency for the rubber filling in the repaired hole in the casing to pull out or loosen, which in prior art patches is due to excessive flexing of the patch adjacent the hole, will be eliminated.

Another object of my invention is to provide a tire repair patch of the general type indicated which is so designed that it has a minimum of flexibility at its center and a maximum of flexibility at its outer edges, the flexibility gradually decreasing from the said outer edges to the center for the purpose of gradually absorbing and decreasing shock, caused by distortion of the tire casing in both a bead-to-bead and a circumferential direction but especially the former, so that substantially all shock is prevented from reaching the rubber filling and loosening of the filling is thereby precluded.

Still another object of my invention is to provide a tire repair patch which includes several plies or strips of rubberized cords arranged in crisscross relationship in combination with additional centrally located reinforcing pads or plies of rubberized cords which are arranged with their cords extending at an angle relative to the cords in the crisscrossed strips and which serve to decrease the flexibility of the patch, in the central area which is adapted to be over the hole in the casing, especially in the bead-to-bead direction.

A further object of my invention is to provide a tire repair patch of the type indicated in the preceding paragraph which is so designed and adapted to be so mounted in the tire casing that the crisscrossed strips work with and stretch with the crisscrossed plies of the casing itself but the centrally located pad or pads work against the stretching of the plies of the casing especially in a bead-to-bead direction and, if desired, in a circumferential direction.

The preferred embodiment of my invention is illustrated in the accompanying drawings wherein similar characters of reference designate corresponding parts and wherein.

Figure 1:
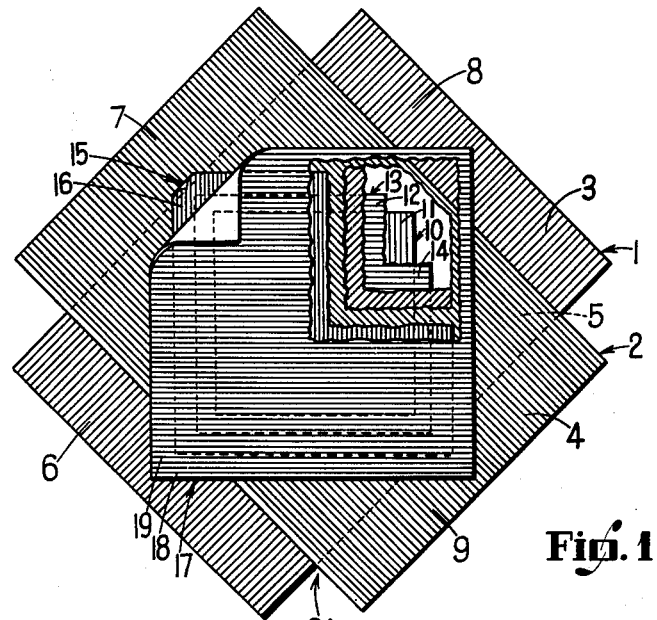
Figure 1 is a plan view, partly broken away, of a tire repair patch made in accordance with my invention, this type consisting of crisscrossed plies and reinforcing pads and being especially suitable for repairing large tire casings.

With reference to the drawings, I have illustrated in Figure 1 a patch made in accordance with my invention and which is especially suitable for use in repairing large tires, such as truck tires. This view is a plan view of that side of the patch which will be disposed in contact with the tire casing and which I shall term the "lower" side. The side which will be exposed or uppermost, when the patch is in the casing, I shall term the "upper" side. The patch of Figure 1 includes a strip 1 and a strip 2 of tire fabric or rubberized cords. The cords 3 of the strip 1 extend longitudinally thereof and the cords 4 of the strip 2 extend longitudinally thereof. The strips 1 and 2 are superimposed in crosscrossed relationship with the cords 3 and 4 extending substantially at right angles to each other. The strips 1 and 2 are of equal lengths and widths, the length of each being greater than its width. Thus, when superimposed they cooperate to form a two ply central area 5 and single ply outer tab portions 6, 7, 8 and 9.

As will later appear, when the patch is placed in a tire casing, the crisscrossed strips 1 and 2 will be so arranged that the cords 3 and 4 thereof will extend in the same directions as the crisscrossed cords of the plies of the tire casing. Thus, great flexibility in a bead-to-bead direction will result. This flexibility is very desirable adjacent the outer portions of the patch but should not be too great at the central area of the patch which will be over and adjacent the hole in the casing, as excessive flexing of this area might cause the rubber filling material in the hole to loosen and even pull out of the hole. Therefore, I provide means at the central area for reinforcing the crisscrossed strips 1 and 2 to decrease the flexibility thereof in two directions, which when the patch is placed in the casing will be a circumferential direction and a bead-to-bead direction. The greatest distortion of the tire casing during use is in a bead-to-bead direction but there is also distortion or flexing in a circumferential direction, especially at high speeds. The reinforcing means will be so disposed that it will work against the flexing or stretching of the pad and casing in a transverse or bead-to-bead direction and in a circumferential direction, but especially in the former.

The reinforcing means comprises one or more pads, preferably square or rectangular, of rubberized cords superimposed on the central area of the crisscrossed strips and with the cords thereof arranged at an angle relative to the cords of the criss-crossed strips. Thus, in Figure 1, I show a small square pad 10 at the upper side of the patch. This pad 10 has the cords 11 thereof extending substantially diagonally of the strips 1 and 2 and at an angle relative to the cords 3 and 4 of the strips 1 and 2. When the patch is placed in the casing, the cords 11 will extend transversely of the casing substantially at right angles to the planes of the beads of the casing. The pad 10 is disposed at the center of the patch and when the patch is in position in the casing, the cords 11 extending in a bead-to-bead direction will reinforce the center of the patch and tend to prevent excessive stretching or flexing of the central part of the patch in a bead-to-bead direction. To reduce the stretching or flexing of the patch in a direction at right angles to that in which the pad 10 acts, a second square pad 12 is placed beneath pad 10 above and in contact with the upper strip 1. This pad 12 is slightly larger in area than pad 10 so as to provide a single ply tab 13 on all edges of the pad which extends outwardly beyond pad 10. The pad 12 has its cords 14 extending at right angles to the cords 11 of tab 10. These cords 14 will extend circumferentially of the tire casing when the patch is positioned thereon and will work against flexing or stretching of the central part of the patch in this direction.

In addition to the two pads 10 and 12 provided on the upper side of the crisscrossed strips 1 and 2, additional reinforcing pads may also be provided on the lower side thereof. Thus, a square pad 15 may be disposed beneath the central area of the lower crisscross strip 2. The cords 16 thereof will extend in the same direction as the cords 11 of pad 10 and, therefore, at an angle to the cords 4 of the strip 2. It will be noted from Figures 1 and 2 that the pad 15 is of slightly greater area than pad 13 and, therefore, extends beyond the pad 12 in all directions. Another square pad 17 is placed beneath the pad 15 and its cords 18 extend in a direction at right angles to the cords 16 of pad 15. It will be noted that pad 17 is of greater area than pad 15 to form an outwardly extending tab 19 on all of its edges which extends beyond the edges of pad 15.

Figure 2:
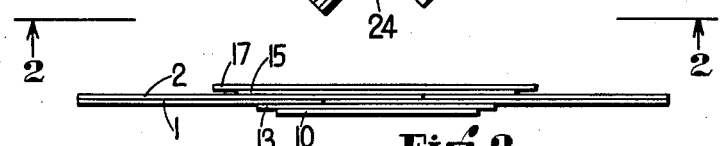
Figure 2 is a side view of the patch taken along line 2—2 of Figure 1.

The rubber of the strips and pads is of the uncured type. The pads and strips are superimposed, as indicated in Figures 1 and 2, and are then subjected to heat and pressure which cures or semi-cures the rubber and cements all of the contacting pads and strips together. It will be noted that the square pads of the patch gradually increase in area from the upper side of the patch to the lower side thereof. It will also be noted that the two upper pads 10 and 12 have a diagonal dimension less than the width of strip 1 while the two lower pads 15 and 17 have a diagonal dimension greater than the width of strip 2. Thus, two opposite corners of each of the pads 15 and 17 extend beyond the side edge of strip 2 and into contact with the upper strip 1 to which they adhere. This patch will consist of six plies at its center, some of which have their cords extending in the same direction as the cords of the tire casing in which it is placed and others of which have their cords extending at an angle thereto. Thus, the pads 10, 12, 15 and 17 reinforce the strips 1 and 2 at the central area thereof and prevent undue stretching of the central areas of the strips. The six ply area of the patch, corresponding to the area of the smallest pad 10, has the least flexibility. However, this flexibility of the patch gradually increases towards its outer edge due to the decrease in number of plies occasioned by the fact that the pads 17, 15, 12 and 10 gradually decrease in size. Thus, in the area corresponding to the extending tab 13 of pad 12 there are five plies, in the area corresponding to the part of the pad 15 which extends beyond pad 12 there are four plies except where its corners extend beyond strip 2 and there are only three plies, and in the area corresponding to the tab 19 of pad 17 there are three plies, except where the corners of pad 17 extend beyond strip 2 there are two plies with the exception of the part of each corner which is over the corner of pad 15 where there are three plies.

Figure 5:
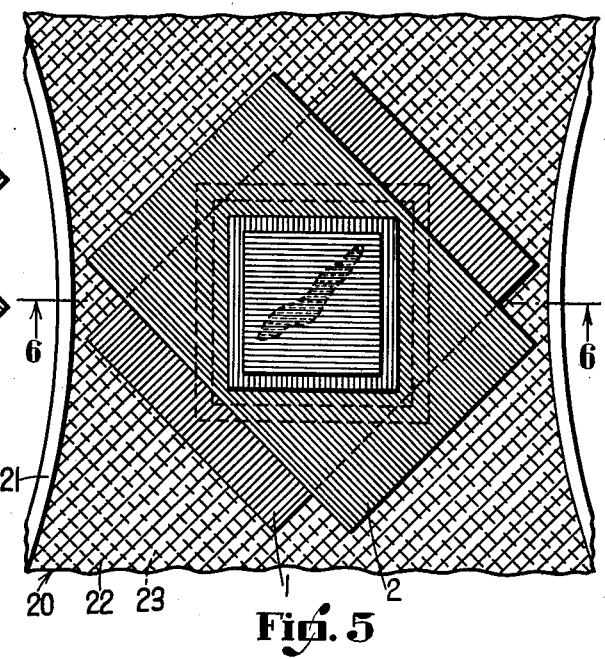
Figure 5 is an interior view of a portion of a tire casing showing the patch of Figures 1 and 2 in position over the hole in the casing.
Figure 6:
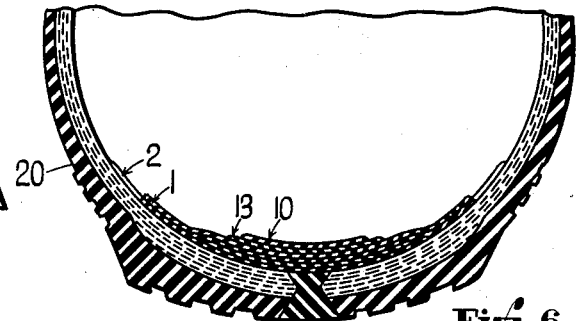
Figure 6 is a transverse sectional view taken along line 6—6 of Figure 5.

In using this patch, it is placed inside the tire casing, as shown in Figures 5 and 6, where the casing is designated 20 and the beads thereof are designated 21. The cords 22 and 23 of the tire fabric are arranged as usual in crisscrossed relationship from bead-to-bead. Of course, it will be understood that in a tire casing there are usually at least four or more plies and the patch is adapted to serve as a substitute for the injured plies. The patch is placed over the hole or injury with its lowermost pad 17 in contact with the surface of the casing. The hole is filled with uncured rubber and the patch and rubber filling are then vulcanized to the casing. The patch is so positioned that the cords 3 and 4 of strips 1 and 2 extend in the same directions as the cords 22 and 23 of the casing. Thus, they work with the cords 22 and 23 to permit bead-to-bead and circumferential flexing or stretching of the tire casing. The pads 10 and 15 will have their cords extending in a bead-to-bead direction at an angle relative to cords 22 and 23 of the casing and will, therefore, resist flexing or stretching of the patch at its central area in a transverse direction which tends to be caused by bead-to-bead distortion of the casing. On the other hand, the pads 12 and 17 will have their cords extending circumferentially of the tire casing at an angle relative to cords 22 and 23 of the casing and will, therefore, resist flexing or stretching of the patch at its central area in a circumferential direction which tends to be caused by circumferential distortion of the tire casing, which occurs especially at high speeds. Although, the flexibility of the central area of the patch is comparatively low which is desirable to prevent loosening and pulling out of the rubber filling material from the hole in the tire casing, the flexibility of the patch towards its outer edges is high. The flexibility of the patch gradually increases from its outer edges to its central area. The tabs 6, 7, 8 and 9 will effectively adhere to the tire casing and provide single ply very flexible outer extremities on the patch with notches 24 therebetween. The two ply area 5 of the overlapping strips 1 and 2 is of less flexibility than the outer tabs. The area of the patch corresponding to tab 19 of pad 17 is mainly a three ply area of less flexibility, and as the plies increase towards the center of the patch by the pads 15, 12 and 10, respectively, the flexibility of the patch is decreased. This gradual decrease in flexibility will result in the gradual absorbing and decreasing of shock, caused by distortion of the tire casing, from the outer edges of the patch to its center and thus prevent substantially all shock from reaching the rubber filling and loosening of the filling is thereby precluded.

Figure 3:
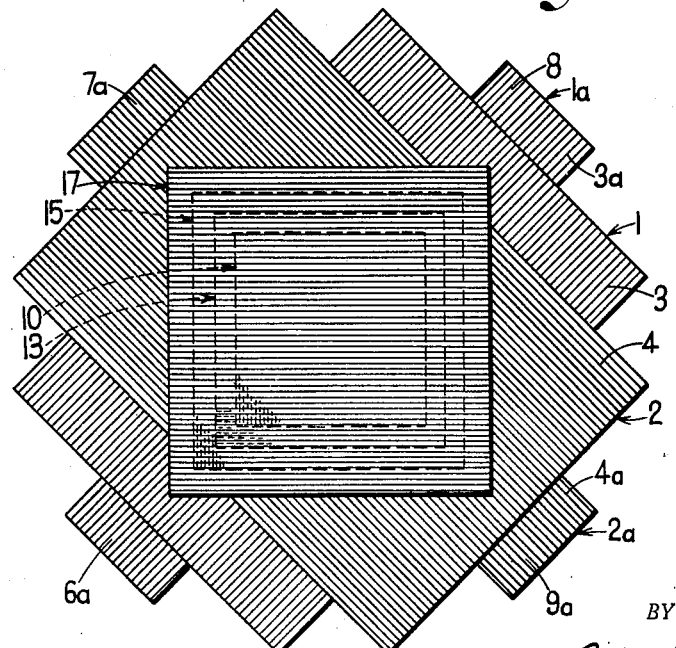
Figure 3 is a plan view showing a patch similar to that shown in Figure 1 but having additional crisscrossed plies.

In Figure 3, I illustrate a patch which is identical with that shown in Figures 1 and 2 with the exception that an additional pair of crisscrossed strips is used. Thus, I provide the strips 1a and 2a which are narrower but longer than the strips 1 and 2. The cords 3a of strip 1a extend in the same direction as the cords 3 of strip 1 while the cords 4a of strip 2a extend in the same direction as the cords 4 of strip 2. The strips 1a and 2a are placed above the uppermost pad 10 of the unit of Figures 1 and 2. The ends of the strips 1a and 2a extend beyond the ends of strips 1 and 2 to form the tabs 6a, 7a, 8a and 9a which engage the surface of the tire casing. This gives two additional plies to the center part of the patch where strips 1a and 2a cross and a single additional ply to other parts of the patch corresponding to the areas of the strips 1a and 2a and four additional single ply tabs 6a, 7a, 8a and 9a.

This patch will be mounted in the tire casing in exactly the same manner as the patch of Figures 1 and 2 shown in the casing in Figures 5 and 6, except that the tabs 6a, 7a, 8a and 9a of strips 1a and 2a will also be in contact with the surface of the casing. The cords of these strips will extend in the same directions as the cords 22 and 23 of the casing 20.

Any number of crisscrossed strips and square pads may be superimposed. The strips and the pads will gradually decrease in area from the lower side of the patch to the upper side thereof. It is preferred that the strips be of rectangular form and the pads be square and that the diagonal dimension of the largest square be less than the length of the longest strip, although other arrangements may be provided.

Figure 4:
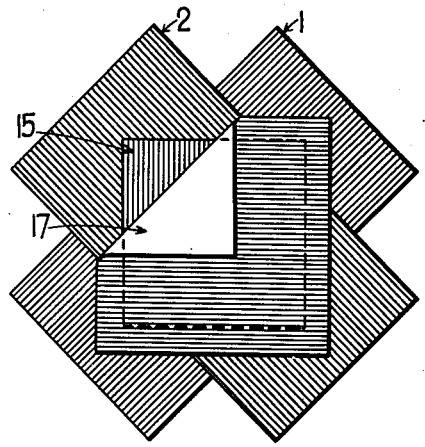
Figure 4 is a plan view showing a patch similar to that shown in Figure 1 but with a lesser number of the reinforcing pads.
Figure 7:
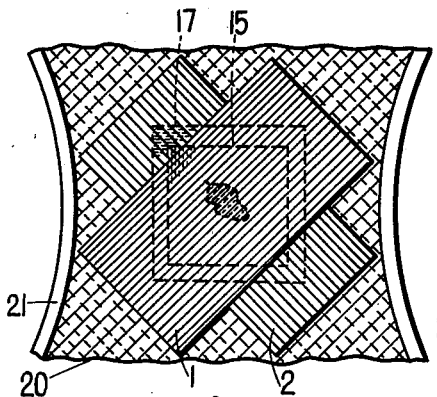
Figure 7 is a view similar to Figure 5 but showing the patch of Figure 4 in position over the hole in the casing.

In Figures 4 and 7, I illustrate a patch composed of less plies than that shown in Figure 1. It is made the same as that of Figure 1 with the exception that only the two lower reinforcing pads 15 and 17 are used with the crisscrossed strips 1 and 2. This patch will be positioned in the tire casing, as shown in Figure 7, exactly the same as the patch of Figures 1 and 2 with the pad 17 lowermost. It will function in the same manner as the other patch with the exception that it will not have as many plies.

Figure 8:
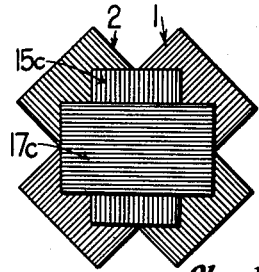
Figure 8 is a plan view of a patch similar to that shown in Figure 4 but having reinforcing pads of different shape.

In Figure 8, I show a patch which is the same as that shown in Figure 4 with the exception that the pads 15c and 17c, which cooperate with strips 1 and 2, are of rectangular form rather than square form. The patch of Figure 3 acts in substantially the same manner as the patch of Figure 4.

It will be apparent from the above discussion that I have provided a patch which is a combination of crisscrossed strips that have their cords extending in the same directions as those of the tire casing and a reinforcing pad or pads that have their cords extending in a direction at an angle to those of the crisscrossed strips and especially in a bead-to-bead direction relative to the tire casing.

A number of advantages of my patch have been discussed and others will be apparent.

Having thus described my invention, what I claim is:

1. A patch comprising a plurality of strips of rubberized fiber cords which are arranged in crisscrossed relationship so as to form overlapping multiple ply areas and outwardly extending tabs of a lesser number of plies, said strips being arranged in pairs and the strips of the different pairs being of different sizes, and a plurality of reinforcing pads of rubberized fiber cords disposed at the center of said crisscrossed strips and with all of their cords disposed in angular relationship to the cords of said strips, the cords of some of said pads extending substantially at right angles to the cords of other said pads, said pads being of different sizes.

2. A patch comprising a plurality of strips of rubberized fiber cords, said strips being of rectangular form and having the cords thereof extending longitudinally thereof, said strips being arranged in superimposed pairs and the two strips of each pair being disposed at right angles to each other, the superimposed strips being of different sizes so that the edges of the various strips are not in alignment, and a plurality of square pads of rubberized fiber cords disposed at the center of said crisscrossed strips and with all of their cords disposed in angular relationship to the cords of said strips, said pads being superimposed relative to each other and to said strips and being or different sizes so that the edges thereof do not coincide, the cords of some of said pads extending substantially at right angles to the cords of other of said pads, the diagonal dimension of the largest of said pads being less than the longest dimension of the smallest of said strips.

3. A patch according to claim 2 wherein said superimposed strips are of gradually increasing area from one side of the patch to the other and said superimposed pads are of gradually increasing area from the same side of the patch.

4. A patch according to claim 3 wherein each of the pads is of such size that it is disposed within the angles of the adjacent criss-crossed strips.

5. The patch of claim 2 in combination with a tire casing, the cords of said strips extending in the same direction as the cords of said tire casing, said superimposed strips being of gradually increasing area from the side of the patch next to the casing to the upper side thereof and said superimposed pads are of gradually increasing area from the same side of the patch.

6. The combination set forth in claim 5 wherein each of the pads of the patch is of such size that it is disposed within the angles of the adjacent criss-crossed strips.

7. A patch comprising a pair of strips of rubberized fiber cords, said strips being of rectangular form and having the cords thereof extending longitudinally thereof, said strips being superimposed and crossed at right angles to each other, and a pair of square pads of rubberized fiber cords disposed at the center of said criss-crossed strips, said pads being superimposed on each other and having the cords thereof disposed at right angles to each other, and said pads being superimposed on the criss-crossed strips in such a manner that all the cords of the pads are disposed in angular relationship to all the cords of the strips, said pads being of such areas that they are disposed within the angles of the criss-crossed strips.

8. A patch comprising a pair of strips of rubberized fiber cords, said strips having the cords thereof extending longitudinally thereof, said strips being superimposed and crossed at an angle relative to each other, and a pair of pads of rubberized fiber cords disposed at the center of said criss-crossed strips, said pads being superimposed on each other and having the cords thereof disposed at right angles to each other, and said pads being superimposed on the criss-crossed strips in such a manner that all the cords of the pads are disposed in angular relationship to all the cords of the strips, said pads being of such areas that they are disposed within the angles of the criss-crossed strips.

CHARLES A. CORNELL.

REFERENCES CITED

The following references are of record in the file of this patent:

UNITED STATES PATENTS

| Number | Name | Date |
|---|---|---|
| 1,631,354 | Ayers | June 7, 1927 |
| 1,653,162 | Forman | Dec. 20, 1927 |
| 1,692,054 | Semler | Nov. 20, 1928 |
| 1,968,606 | Knapton | July 31, 1934 |
| 2,041,988 | Wilson | May 26, 1936 |
| 2,057,797 | Springer | Oct. 30, 1936 |
| 2,342,195 | Heintz | Feb. 22, 1944 |
| 2,344,677 | Cornell | Mar. 21, 1944 |